United States Patent Office

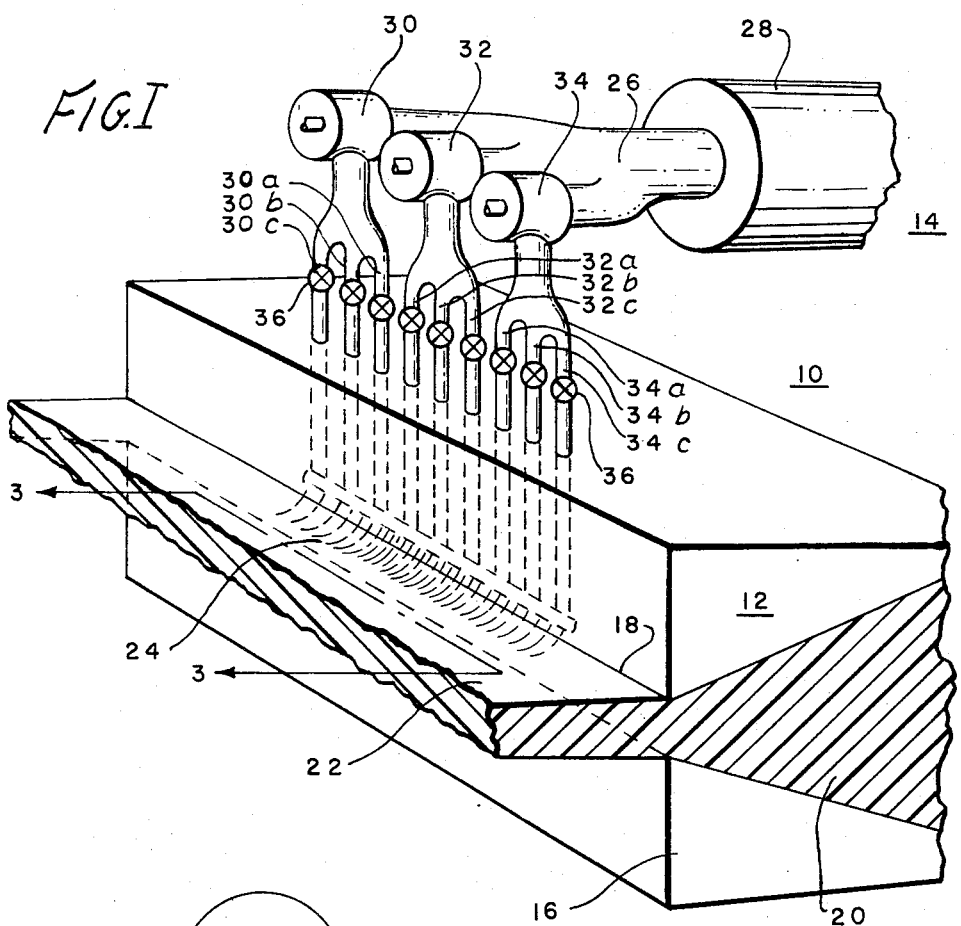
FIG. I
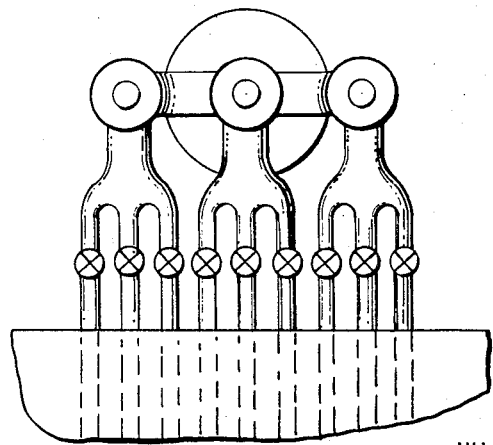
FIG. II
WILLIAM HING
FRANCIS T. BUCKLEY INVENTORS.

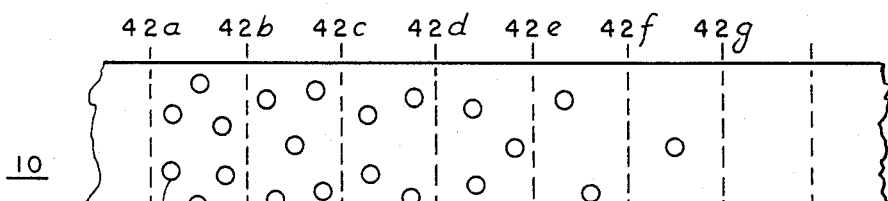
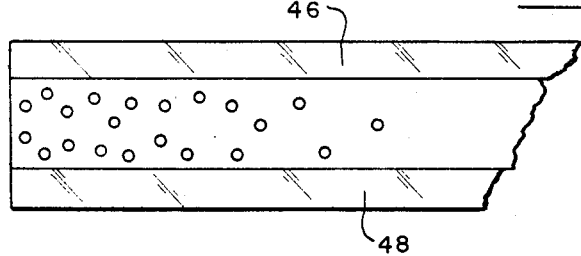
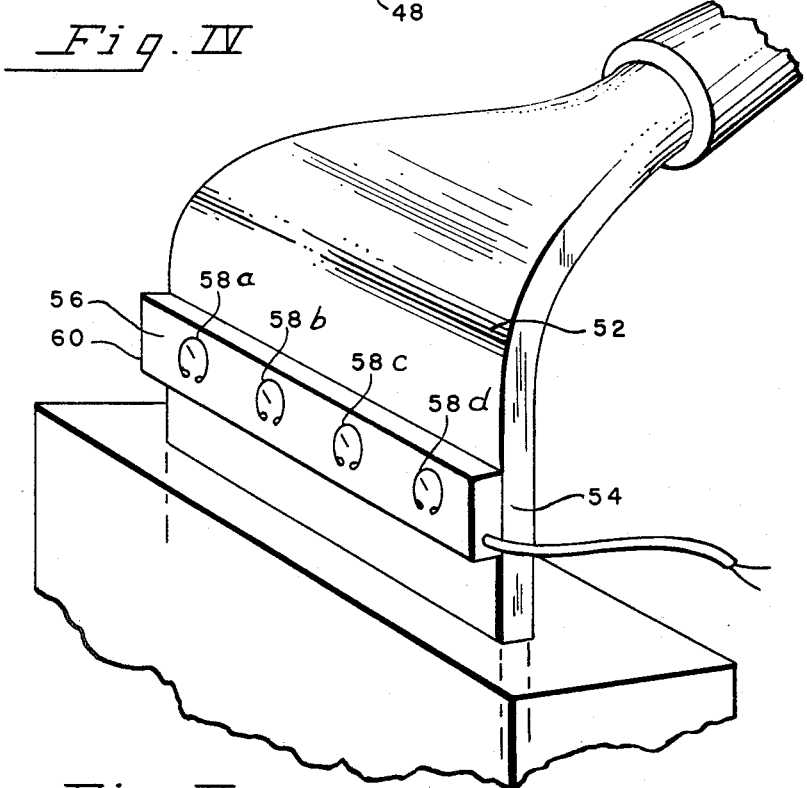
WILLIAM HING, FRANCIS T. BUCKLEY INVENTORS.

3,405,425
Patented Oct. 15, 1968

3,405,425
APPARATUS FOR PRODUCING PARTIALLY
PIGMENTED PLASTIC SHEETS
Francis T. Buckley, Hampden, Mass., and William Hing, New Hartford, N.Y., assignors to Monsanto Company, St. Louis, Mo., a corporation of Delaware
Filed Sept. 18, 1964, Ser. No. 397,507
4 Claims. (Cl. 18—13)

ABSTRACT OF THE DISCLOSURE

Disclosed herein is an apparatus for producing interlayers for use in laminated panels wherein the interlayer used to bond the laminate contains pigmented particles which are distributed uniformly in individual, parallel and adjacent bands which extend longitudinally along the interlayer. The pigment concentration of these bands are uniformly reduced between adjacent bands to provide a color gradient.

---

Present day safety laminates generally comprise two or more pellucid panels with a plastic transparent layer interposed between each of the panels. The interlayer conventionally used is composed of a plasticized polyvinyl acetal resin and is generally extruded or formed into films having thicknesses of 0.015″ and greater. The most important application for laminates of this type are as windshields for automotive, military vehicles, aircraft, etc. In addition, applications are increasing in the architectural and decorative areas.

Some of the present laminates used in windshield applications are partially colored to reduce the effects of glare and heat upon the occupants of an automobile, aircraft, etc. These laminates are produced by printing a portion of the plastic interlayer with a dye which diffuses through the body of the plastic. The manufacturer attempts to obtain a smooth gradually fading effect with the dye by decreasing the concentration and quantity of dye being applied across the width of the plastic sheet. Unfortunately, the rate of dye diffusion tends to vary and the process is difficult to control resulting in laminates having somewhat irregular color gradients.

Although the use of dyes to produce a gradual fading color band serves to reduce the effects of glare and heat, it has been found that overall improvement in these properties may be obtained by the use of pigments incorporated into the body of the sheet.

Accordingly, it is the principal object of this invention to provide an apparatus for producing a plastic sheet useful in laminates, having a color band possessing improved glare and heat-resistant properties.

The following drawings are provided for the purpose of illustrating various embodiments of the present invention.

FIGURE I illustrates a plastic sheet extrusion apparatus and a manifold which is being used to introduce pigmented material into the system.

FIGURE II illustrates a front view of the manifold system shown in FIGURE I.

FIGURE III is an exploded view partly in section illustrating the side view of the plastic sheet being extruded in FIGURE I taken across section 3—3 of FIGURE I.

FIGURE IV is an exploded view partly in section illustrating the sheet of FIGURE III laminated between a pair of pellucid panels.

FIGURE V illustrates an alternate manifold embodiment which may be utilized in place of the manifold of FIGURE II.

Referring in detail to the figures of the drawings, and more specifically FIGURES I and II, there is schematically shown an extrusion apparatus 10 consisting of a primary extrusion unit 12 and a secondary extrusion unit 14. The primary extrusion unit 12 consists of a sheet forming section 16 having rectangularly-shaped die lips 18. A mainstream of plastic material 20 flows between the die lips 18 to form a sheet 22. This mainstream is supplied to the primary extrusion unit 12 by a conventional-type extruder, not shown. A secondary source of plastic material 24 containing a pigment flows into the mainstream via a manifold system 26 which forms part of the secondary extrusion unit 14. The secondary extrusion unit 14 consists of an extruder 28, partially shown, which feeds pigmented plastic material 24 to a manifold system 26 provided with a plurality of variable speed pumps 30, 32 and 34 which in turn individually feed three discharge tubes, identified respectively as 30 a,b,c; and 34 a,b,c which terminate adjacent the die lips 18 within the mainstream of plastic material 20. Each tube is provided with a valve 36 for adjusting plastic flow within the tube. The pumps 30, 32 and 34 and the valves 36 serve to vary the flow of portions of the pigmented stream emanating from the manifold.

In operation, the mainstream of plastic material 20 is forced between die lips 18 by means of an extruder not shown to form a sheet 22. At the same time, the extruder 28 of the secondary extrusion unit 14 operates to feed a reduced volume of plastic material 24 which contains a pigment through the manifold system 26 towards the series of pumps 30, 32 and 34. Each of these pumps are designed to deliver predetermined quantities of pigmented plastic material 24 per unit time. For example, pump 30 is designed to operate at a higher volumetric rate than pump 32 and so on. Furthermore as pigmented plastic material discharges from the respective pumps into the individual discharge tubes, the rate of flow within each tube can be further adjusted by means of a valve 36 to produce a uniform variation in plastic flow between each adjacent tube. This operation results in a flow of several parallel lines of pigmented plastic material into the mainstream of plastic material 20. The flow rate of each line of pigmented plastic is adjusted to produce a band of pigmented plastic in the extruded sheet 22 having a predetermined concentration of pigment particles. Several of such bands in parallel will tend to produce a color gradient effect across a surface portion of the sheet.

An exploded front view of the sheet 22 is shown in FIGURE III wherein the borders of the bands of pigment particles are indicated by dash lines 42a, 42b, etc. FIGURE IV shows the sheet of FIGURE III in laminate form thereby illustrating the general application for sheet of this type. The panels 46 and 48 are transparent and are generally composed of glass. As shown in FIGURE III, each band contains a specific quantity of pigment particles 44 reduced in number for each band proceeding from left to right. In this embodiment, each of the adjacent bands are reduced by one pigment particle moving from left to right. However, it is possible to vary the concentrations of pigment particles between adjacent bands in other ways. For example, the pigment concentration of adjacent bands may decrease and subsequently increase or vice versa. Furthermore, it is possible to vary the width of the various bands to produce particular color gradient effects.

FIGURE II discloses more clearly the manifold system described in FIGURE I. FIGURE V, however, discloses alternate manifold means for controlling the flow of pigmented plastic material to the primary extrusion section. More specifically, plastic material discharges from a manifold 52 through a rectangularly-shaped duct 54. The flow rate of pigmented plastic across the duct is controlled by an incrementally temperature controlled bar 56 regulated via rheostats 58a, 58b, etc. This bar 56 is heated incrementally to produce a temperature gradient along the bar which results in a temperature gradient being transmitted to the plastic material as it flows through the duct 54. In this embodiment, the bar is heated so that temperature of the pigmented plastic material will be highest along one side 60 of the duct tapering off from left to right. This temperature gradient causes the plastic material closest to the side 60 to flow more rapidly into the main stream of plastic within the primary extrusion unit 12 shown in FIGURE I. As a result, a color gradient in the sheet is produced similar to that obtained using the manifold shown in FIGURE II. It is, of course, obvious that other manifold control means for varying the flow of portions of the pigmented stream into the mainstream of plastic may also be employed to produce a color gradient effect. The above description and particularly the drawings are set forth for the purpose of illustration only and not for the purpose of limitation.

In general, the present invention comprises feeding a plurality of pigmented plastic streams into a main plastic stream and shaping the mainstream in the form of a sheet containing pigment particles which are distributed uniformly in individual, parallel and adjacent bands extending longitudinally along the sheet. In general, a band refers to a longitudinally extending area within a plastic sheet which contains a definite quantity or concentration of pigment particles. The edge or lateral boundary of a band is considered to be a line demarcating a change in pigment concentration. In most instances, the change in pigment concentration between adjacent bands will be so slight that the line of demarcation cannot be discerned. However, when several bands are in parallel, and uniformly reduced in pigment concentration between respective adjacent bands, an overall smooth color change or color gradient is visually noticeable.

For optimum effect, the gradient or change in color density should be gradual and uniform across the surface of the sheet. In general, the change in color density will depend on the individual flow rates of the various pigmented plastic streams being injected into the primary extruding stream of plastic. It is, of course, possible to vary the concentration of the various pigmented streams being injected as opposed to varying the flow of each stream. However, this procedure is generally more difficult to control.

Although the mainstream of the plastic, referred to above, is normally unpigmented, it is, of course, possible to incorporate a different color pigment within the mainstream if desired. On the other hand, it is sometimes desirable to incorporate the same pigment used to create the bands within the main plastic stream but in a different concentration.

The gradient or change in color density obtainable in the practice of the present invention is in general more uniform and much more controllable than that previously obtainable by the use of dyes printed in varying concentrations on the surface of a plastic sheet. In addition the absorption effect obtainable with the use of pigments as opposed to the previous dye systems is superior. Furthermore the size of the pigment particles can be controlled for optimum absorption, light transmission and continuity of color. Most suitable are average pigment sizes less than forty microns and more preferably less than ten microns.

The pigment concentration can vary within wide limits depending on the transmission desired after lamination. To obtain the desired effect, the transmission at the darker portions of the gradient should be less than 25% and more preferably less than 10% with a minimum of about 1%. As previously indicated, the transition between the heavily pigment areas and the non-pigmented or slightly pigmented areas should be smooth and uniform resulting generally in transmissions through the transition area varying anywhere from less than 10% to less than 95%. (Transmission values determined by G.E. spectrophotometer using Illuminate A light source).

Various types of pigments may be employed in the practice of the present invention. In general, these pigments constitute discreet particles which may be inorganic or organic materials. Typical of the pigments which may be employed are titanium dioxide, carbon black, phthalocyanine blue, ultramarine blue, medium chrome green, dark chrome green, phthalocyanine blue and green, cadmium red, molybdate orange, medium chrome yellow, light chrome yellow, alizarine-maroon, quinacridone maroons, reds and scarlets, beta-oxynapthoic reds and maroons, anthraquinone types including flavanthrone, anthanthrone and indanthrone derivatives, perinone and perylene pigments, thioindigo pigments, hansa yellows including benzidene derivatives, nickel complex-azo yellow, burnt umber (oxide brown), ferrite yellow (oxide yellow), oxide red, and the like.

The plastics which are employed in the practice of this invention are thermoplastic materials which are substantially transparent and suitable as interlayers for pellucid panels. The plastic interlayer is preferably formed of synthetic resinous material such as, for example, plasticized polyvinyl acetal. However, different plastics varying in thickness and physical characteristics may be employed.

In general, the plastic sheets of the present invention are laminated between pellucid panels. These panels are usually composed of any rigid or semi-rigid material which is substantially transparent in nature. Typical of such materials are glass, synthetic plastic materials, both thermoplastic and thermoset in nature, such as polymethyl methacrylate, polystyrene, polyvinyl chloride, polypropylene, polyethylene terephthalate, cellulose acetate, cellulose nitrate and the like. Particularly preferred is glass.

As earlier indicated, the plastic sheets which are produced in the practice of this invention find their main application as interlayers for laminates. The preferred laminate construction is prepared by interposing a partially pigmented plasticized polyvinyl acetal interlayer between a pair of glass plates and then laminating by any suitable method which generally comprises subjecting the resulting assembly to a temperature of about 200 to 325° F. and a pressure of 150 to 225 p.s.i. for at least ten minutes to bond the assembly together. More detail methods may be found in U.S. Patent No. 2,290,193 and U.S. Patent No. 2,948,645. In general, the interlayer thicknesses in the architectural, decorative, automotive fields, etc. are in excess of 0.010". The laminates conventionally used for windshields of automobiles are generally about 0.015" thick. However, laminates are being prepared for various applications where the interlayer thickness varies anywhere from 0.010" up to 0.065".

The preferred polyvinyl acetal resins may be made from various unsubstituted aldehydes or mixtures thereof. A particularly preferred acetal resin is polyvinyl butyral. In general, the acetal resin is made by reacting an aldehyde with hydrolyzed polyvinyl ester in the presence of a solvent for the product and precipitating the resin product with water. More detailed methods for preparing such resins are set forth in Morrison et al. U.S. Patent Re. 20,430, issued June 29, 1937, and Lavin et al. U.S. Patent No. 2,496,480, issued Feb. 7, 1950.

In general, the preferred polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyral, the polyvinyl butyral resin will preferably contain, on a weight basis, from 16 to 25% hydroxyl groups, calculated as polyvinyl alcohol and from 0 to 3% acetate groups, calculated as polyvinyl acetate, the balance being substantially butyraldehyde acetal.

Any suitable plasticizer may be used in preparing the preferred polyvinyl acetal compositions useful as interlayers. In general, the plasticizers which are commonly employed are esters of a polybasic acid or a polyhydric alcohol. Among the suitable plasticizers are triethylene glycol di(2-ethyl-butyrate), triethylene glycol dihexoate, glyceryl mono-oleate, dibutyl sebacate and di(beta-butoxy-ethyl)adipate dialkyl phthalates, i.e. dioctyl phthalate, dibutoxy ethyl phthalate, etc.

The amount of plasticizer to be added to the preferred polyvinyl acetal resin may be varied within wide limits. Mixtures containing up to 100 parts of plasticizer per 100 parts of polyvinyl acetal resin may be used with satisfactory results. However, for general safety laminate use, the plasticizer content should be between 15 to 60 parts per 100 parts of polyvinyl acetal resin and more preferably 20 to 50 parts per 100 parts of polyvinyl acetal resin.

The plastic sheets of the present invention find special application in the automotive and aircraft industry as interlayers for window laminates which shield the passengers from the effects of solar light and heat while at the same time protecting the passengers against the hazards of flying objects and injury caused by bodily impact against the laminate. In addition, laminates employing these interlayers find application in the architectural and decorative areas. For example, many of the more modern building constructions feature glass laminates in windows, doors and even partitions. Furthermore, the improved ease and economics of producing these interlayers tends to increase their usage.

What is claimed is:

1. An apparatus for producing a partially pigmented plastic sheet adapted for use as the interlayer in pellucid laminates comprising:
   (A) a primary extrusion unit for extruding a mainstream of plastic, said primary extrusion unit having a rectangularly shaped discharge orifice; and
   (B) a secondary extrusion unit for introducing the pigmented material into the mainstream of the primary extrusion unit which comprises;
      (1) an extruder for extruding a pigmented stream of plastic;
      (2) a manifold system comprising a main trunk and a plurality of branches wherein the main trunk is mounted at the discharge end of the secondary extruder;
      (3) manifold control means for varying the flow of portions of said pigmented stream emanating from each branch of said manifold system; and
      (4) a plurality of discharge tubes mounted at the discharge end of each branch of the manifold system and connecting the manifold system of the secondary extruder with the primary extruder such that pigmented material extruded through the manifold system of the secondary extrusion unit passes through the discharge tubes and is introduced into the mainstream of the secondary extrusion unit.

2. The apparatus according to claim 1 wherein the manifold control means comprise a plurality of variable speed pumps in parallel.

3. The apparatus according to claim 1 wherein the manifold control means comprise heating means designed to produce a temperature gradient across the pigmented stream emanating from said manifold.

4. The apparatus according to claim 1 wherein the discharge tubes are provided with valves for adjusting the flow of plastic within the tubes.

References Cited

UNITED STATES PATENTS

| | | | |
|---|---|---|---|
| 3,069,301 | 12/1962 | Buckley et al. | 161—199 |
| 2,803,041 | 8/1957 | Hill et al. | 18—13 |
| 2,985,556 | 5/1961 | Rowland | 264—171 |
| 3,244,582 | 4/1966 | Kiihl | 161—199 |

ROBERT F. BURNETT, *Primary Examiner.*

W. J. VANBALEN, *Assistant Examiner.*